(12) United States Patent
Loesch et al.

(10) Patent No.: US 8,095,967 B2
(45) Date of Patent: Jan. 10, 2012

(54) SECURE WEB SITE AUTHENTICATION USING WEB SITE CHARACTERISTICS, SECURE USER CREDENTIALS AND PRIVATE BROWSER

(75) Inventors: William Loesch, Hillsborough, CA (US); Derek Fluker, Cupertino, CA (US)

(73) Assignee: White Sky, Inc., San Mateo, CA (US)

( * ) Notice: Subject to any disclaimer, the term of this patent is extended or adjusted under 35 U.S.C. 154(b) by 1200 days.

(21) Appl. No.: 11/881,482

(22) Filed: Jul. 27, 2007

(65) Prior Publication Data

US 2008/0028444 A1    Jan. 31, 2008

Related U.S. Application Data

(60) Provisional application No. 60/833,687, filed on Jul. 27, 2006, provisional application No. 60/836,572, filed on Aug. 9, 2006, provisional application No. 60/961,584, filed on Jul. 23, 2007.

(51) Int. Cl.
*G06F 21/00* (2006.01)

(52) U.S. Cl. .............................. 726/5; 726/22

(58) Field of Classification Search ...................... 726/22
See application file for complete search history.

(56) References Cited

U.S. PATENT DOCUMENTS

| | | | |
|---|---|---|---|
| 4,200,770 A | 4/1980 | Hellman et al. | |
| 5,206,803 A | 4/1993 | Vitagliano et al. | |
| 2002/0010769 A1* | 1/2002 | Kippenhan et al. | ........... 709/223 |
| 2004/0102182 A1 | 5/2004 | Reith et al. | |
| 2004/0117478 A1 | 6/2004 | Triulzi et al. | |
| 2004/0123157 A1 | 6/2004 | Alagna et al. | |
| 2004/0181571 A1 | 9/2004 | Atkinson et al. | |
| 2004/0181585 A1 | 9/2004 | Atkinson et al. | |
| 2004/0230825 A1* | 11/2004 | Shepherd et al. | ............. 713/200 |
| 2004/0236681 A1 | 11/2004 | Modigliani et al. | |
| 2004/0260778 A1 | 12/2004 | Banister et al. | |
| 2005/0015455 A1 | 1/2005 | Liu | |
| 2005/0015626 A1 | 1/2005 | Chasin | |
| 2005/0076084 A1 | 4/2005 | Loughmiller et al. | |
| 2005/0078660 A1 | 4/2005 | Wood | |
| 2005/0132060 A1 | 6/2005 | Mo et al. | |
| 2005/0182735 A1 | 8/2005 | Zager et al. | |
| 2005/0182773 A1 | 8/2005 | Feinsmith | |
| 2005/0198173 A1 | 9/2005 | Evans | |
| 2005/0198174 A1 | 9/2005 | Loder et al. | |
| 2005/0210106 A1 | 9/2005 | Cunningham | |
| 2005/0216300 A1 | 9/2005 | Appelman et al. | |
| 2005/0251861 A1 | 11/2005 | Cunningham et al. | |
| 2005/0257261 A1 | 11/2005 | Shraim et al. | |

(Continued)

*Primary Examiner* — Gilberto Barron, Jr.
*Assistant Examiner* — Virginia T Ho
(74) *Attorney, Agent, or Firm* — Richard B. Main (57) ABSTRACT

A secure authentication process detects and prevents phishing and pharming attacks for specific web sites. The process is based on a dedicated secure hardware store for user sign-in credentials, a database of information about specific web sites, and a private secure browser. All user web activity is monitored by an agent program. The agent program checks to make sure that user attempts to send any sign-in credentials stored in secure hardware store of user sign-in credentials, to any web site accessed by the user, is allowed only if the IP address of the web site accessed by the user matches at least one of the IP addresses stored web site database associated with the sign-in credential the user is attempting to send. The process also detects mismatches between a URL and the actual IP address of the web site associated with the URL.

8 Claims, 4 Drawing Sheets

U.S. PATENT DOCUMENTS

| | | |
|---|---|---|
| 2005/0257265 A1 | 11/2005 | Cook et al. |
| 2005/0257266 A1 | 11/2005 | Coo et al. |
| 2005/0278544 A1* | 12/2005 | Baxter .................... 713/182 |
| 2006/0004896 A1 | 1/2006 | Nelson et al. |
| 2006/0015563 A1 | 1/2006 | Judge et al. |
| 2006/0015566 A1 | 1/2006 | Sampson |
| 2006/0015722 A1 | 1/2006 | Rowan et al. |
| 2006/0015944 A1 | 1/2006 | Fields |
| 2006/0015945 A1 | 1/2006 | Fields |
| 2006/0021031 A1 | 1/2006 | Leahy et al. |
| 2006/0031319 A1 | 2/2006 | Nelson et al. |
| 2006/0041508 A1 | 2/2006 | Pham et al. |
| 2006/0047766 A1 | 3/2006 | Spadea, III |
| 2006/0053293 A1 | 3/2006 | Zager et al. |
| 2006/0068755 A1 | 3/2006 | Shraim et al. |
| 2006/0069697 A1 | 3/2006 | Shraim et al. |
| 2006/0070126 A1 | 3/2006 | Grynberg |
| 2006/0075027 A1 | 4/2006 | Zager et al. |
| 2006/0075028 A1 | 4/2006 | Zager et al. |
| 2006/0075504 A1 | 4/2006 | Liu |
| 2006/0080437 A1 | 4/2006 | Lake |
| 2006/0095404 A1 | 5/2006 | Adelman et al. |
| 2006/0095459 A1 | 5/2006 | Adelman et al. |
| 2006/0095586 A1 | 5/2006 | Adelman et al. |
| 2006/0095955 A1 | 5/2006 | Vong |
| 2006/0112433 A1 | 5/2006 | McIsaac et al. |
| 2006/0123464 A1 | 6/2006 | Goodman et al. |
| 2006/0123478 A1 | 6/2006 | Rehfuss et al. |
| 2006/0129644 A1 | 6/2006 | Owen et al. |
| 2006/0149821 A1 | 7/2006 | Rajan et al. |
| 2006/0150256 A1 | 7/2006 | Fanton et al. |
| 2006/0156017 A1 | 7/2006 | McIsaac et al. |
| 2006/0168006 A1 | 7/2006 | Shannon et al. |
| 2006/0168018 A1 | 7/2006 | Levin et al. |
| 2006/0168021 A1 | 7/2006 | Levin et al. |
| 2006/0168022 A1 | 7/2006 | Levin et al. |
| 2006/0168057 A1 | 7/2006 | Warren et al. |
| 2006/0168059 A1 | 7/2006 | Chang et al. |
| 2006/0184632 A1 | 8/2006 | Marino et al. |
| 2006/0184634 A1 | 8/2006 | Owen et al. |
| 2006/0184635 A1 | 8/2006 | Owen et al. |
| 2007/0006322 A1* | 1/2007 | Karimzadeh et al. ............ 726/27 |
| 2008/0060063 A1* | 3/2008 | Parkinson ....................... 726/5 |
| 2008/0184358 A1* | 7/2008 | Stamos et al. .................. 726/11 |
| 2009/0119679 A1* | 5/2009 | Dowlan et al. ................. 719/313 |

* cited by examiner

SECURE WEB SITE AUTHENTICATION USING WEB SITE CHARACTERISTICS, SECURE USER CREDENTIALS AND PRIVATE BROWSER

CROSS-REFERENCE TO RELATED APPLICATION

This application claims priority under 35 U.S.C. 119(e) and 37 C.F.R. 1.78(a) (4) based upon U.S. Provisional Application, Ser. No. 60/833,687 for SYSTEM AND METHOD FOR UTILIZING A DATABASE OF WEB SITE CHARACTERISTICS TO FACILITATE SECURE AUTHENTICATION, filed Jul. 27, 2006, U.S. Provisional Application, Ser. No. 60/836,572 for SYSTEM AND METHOD FOR UTILIZING A DATABASE OF WEB SITE CHARACTERISTICS TO FACILITATE SECURE AUTHENTICATION, filed Aug. 9, 2006, and U.S. Provisional Application, Ser. No. 60/961,584 for SYSTEM AND METHOD FOR UTILIZING A DATABASE OF WEB SITE CHARACTERISTICS TO FACILITATE SECURE AUTHENTICATION, filed on Jul. 23, 2007, all said provisional applications being incorporated herein by reference.

BACKGROUND OF THE INVENTION

The present invention relates to the field of online computer security. In particular, the present invention provides a system and process for maintaining a database of information and characteristics about specific web sites, particularly the web sites of financial institutions, to facilitate more secure authentication of selected web sites and to protect against "phishing" and "pharming" attacks. The process allows user/clients to utilize the information and characteristics stored in the website database to help to validate the identity of the website before passing sensitive information to the website such as authentication credentials. The present invention allows user/clients of multiple online services to periodically receive updated information about selected websites.

Wide spread use of the Internet for electronic transactions has resulted in the need for specific and secure identification of a user, or client, who wishes to connect with a particular website server so that business may be conducted by the user/client, or so that the user/client may access confidential information which the user/client is authorized to obtain. Common instances of the most simple form of this type of transaction are user/client interactions with a bank server for the transaction of business with the bank or for obtaining information regarding the user/client accounts. Other such instances are user/client interactions with medical providers or insurance companies or government agencies where confidential information related to the user/client is maintained. Also, user/client interactions with Internet businesses for the execution of electronic commerce transactions represents a situation in which the merchant may employ an authenticating algorithm to speed the process of identification of users of the site.

Cyber criminals use two different types of attacks to steal user/client confidential authentication information (e.g. user name and password): "phishing" and "pharming". In phishing (pronounced "fishing") attacks, cyber criminals send out a wave of spam email, sometimes up to millions of messages. Each email contains a message that appears to come from a well-known and trusted company (i.e. bank or other financial institution). The message urges the recipient to click on a link provided in the mail. Upon clicking on the link provided in the phishing email, the user/client is presented an authentic-looking, but actually bogus web site which asks the user/client to enter his/her confidential authentication information, that is, usernames, passwords, etc.

Pharming (pronounced "farming") is another form of online fraud. Pharmers rely upon the same bogus web sites and theft of confidential information to perpetrate online scams, but are more difficult to detect because they do not rely upon the victim accepting a "bait" message. Instead of relying on users clicking on an enticing link in fake email messages, pharming instead use an attack called DNS (domain name server) cache poisoning to redirect victims to the bogus web site even if they type the right web address of their bank or other online service into their web browser. Domain name servers are often associated with Internet service providers (ISP's) and function to convert calls to URL's (uniform resource locators), such as the form www.website.com, to numeric IP (Internet protocol) addresses for their subscribers. In DNS cache poisoning, the correspondence between one or more selected URL's and their IP addresses is corrupted to redirect calls to the selected URL's to IP addresses of servers controlled by the pharmers.

Figure 1:
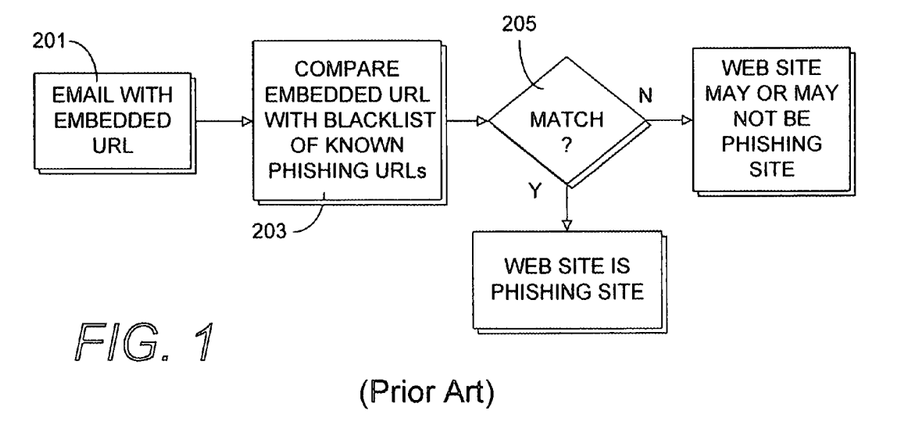
FIG. 1 is a flow diagram showing a conventional blacklist approach to protecting against phishing attempts.

There have been attempts to develop tools to help users/clients detect and avoid pharming and phishing attacks. One scheme is to maintain and update a "blacklist" of known web sites used in past phishing attacks, which cannot be used to protect against pharming attacks. FIG. 1 illustrates how this a blacklist scheme works. An email 201 with an embedded URL has the URL compared at 203 with a blacklist of known phishing URL's. If the comparison is a match at 205, the web site is probably a phishing site. If no match at 205 occurs, the web site in question may or may not be a phishing site. In actual practice, blacklist tools are not very effective against phishing attacks because cyber criminals routinely change the URL in their phishing emails on a daily or even hourly basis. As a result of this weakness, blacklist anti-phishing solutions are usually combined with "heuristic" algorithms which attempt to monitor every web site visited by the user/client and determine, based on characteristics of the web site whether that site might be a bogus phishing or pharming site. Heuristic algorithms often make use of artificial intelligence techniques.

Figure 2:
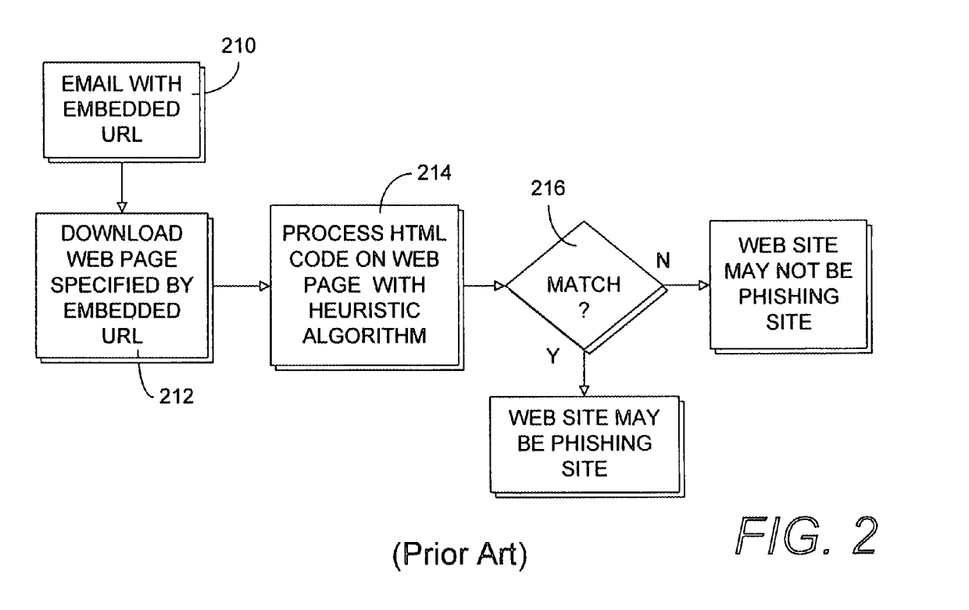
FIG. 2 is a flow diagram showing a conventional heuristic approach to protecting against phishing attempts.

In order to be effective, heuristic algorithms must look at every web page visited by the user. Heuristic algorithms typically look at characteristics of the web page together with the web site URL and IP address and attempt to rank the security risk of the web page. FIG. 2 illustrates the operation of a heuristic algorithm. The email 210 with an embedded URL is processed, and the web site specified is downloaded at 212 and analyzed by the heuristic algorithm at 214. If a match occurs at 216, the web'site may be a phishing site, but the result is inconclusive. If no match occurs at 216, the web site may not be a phishing site, but again the test is not conclusive. Heuristic algorithms are almost impossible to test and typically result in both false positive and false negative results.

Another approach which attempts to address the phishing/pharming problem is to maintain a "whitelist" database of known good websites, such as the URL's of such sites and compares these with any web page with which access is attempted. Some whitelist approaches test other characteristics of web sites, such as IP addresses, digital signatures, and the like. Whitelist authentication processes cannot typically provide protection against pharming sites and, in general, are not very effective as a sole means of secure web site authentication.

All of the methods described above to guard end-users against phishing and pharming attacks suffer from two problems: such methods are designed to provide the end-user with a security warning within a standard, open web browser program, such as MICROSOFT INTERNET EXPLORER, NETSCAPE, MOZILLA FIREFOX, or the like. In many cases, end-users don't recognize or notice such security warnings when given. Additionally, such methods work within standard web 2093198,1 5 browser programs. Standard web browser programs have open interfaces and are therefore vulnerable to malicious software plug-ins which can compromise an end-user's security.

SUMMARY OF THE INVENTION

This invention provides a process which overcomes deficiencies of known web site authentication processes. The invention provides an improved approach to providing users/clients with a tool to defeat both phishing and pharming attacks. An embodiment of the process couples a dedicated secure hardware store for end-user log-on credentials with a private web browser application which cannot be compromised by plug-ins and a whitelist of known financial institution web sites to provide secure authentication and guard against pharming and phishing attacks.

An embodiment of the process provides a secure password store. The password store is a secure repository for user sign-in credentials, such as a username and a password. Information in the password store is not stored on the client computer, but instead is stored in a separate protected memory, such as a smart card, a non-volatile USB (universal serial bus) memory device, or some other equivalent hardware token which can be disconnected from the user's computer when not needed to greatly reduce vulnerabilities to corruption. Client software is provided which allows end users to enter and store their sign-in credentials for selected web sites in the password store. The hardware-protected password store is coupled with a web site database which contains specific information about selected web sites, especially the web sites of financial institutions. Such web site database is protected by a digital signature stored in the protected memory, so that only an end-user possessing the protected memory hardware store can access the web site database. Information in this web site database includes the web site URL, web site IP address (or addresses), and textual and/or graphical information contained in the web site. The web site database is stored on the end-user's computer and is periodically updated with new information sent from an update web site database server. Such updates are also protected by the digital signature stored in the protected memory.

The phishing protection embodiment operates in the following way: An agent program monitors all attempts by user to send data to any web site. The agent program accomplishes this through agent program plug-ins to standard web browsers. The agent program intercepts any "post" data stream and checks to see if any text fields within post stream match any credentials stored in the password store. If no match is detected, the agent program allows user data to be sent to web site. If a match is detected, the agent program retrieves the actual IP address of the site contacted and compares it with the IP address or addresses for the specific entry in the web site database associated with the sign-in credential which matches the text typed by the user. If no match is detected, the agent program warns the user and prevents the user from sending the user's credentials to the web site. If a match is detected, the agent program starts a private browser and sends user's credentials to web site. If the user's credentials are accepted by the web site, a session is established and run completely within the private browser.

The private browser of the authentication process is a program which processes web page code in a manner similar to standard browsers. However, the private browser has no capabilities for the installation of browser plug-ins. Browser plug-ins are extensions of standard browser programs which usually perform additional, beneficial functions for the user, such as image readers, media players, and the like. However, malicious plug-ins have been devised which perform actions detrimental to the user, such as stealing sign-on credentials which are sent to web sites operated by cyber criminals, and other malicious actions. The lack of a capability of installing any kind of plug-ins in the private browser makes it invulnerable to this kind of corruption.

The pharming protection embodiment includes the following steps: The user enters a web site URL into the user's standard web browser, by any method, such as typing in the URL, clicking on a link, or the like. The agent program checks to see if the web site URL entered by user into the web browser matches any of the web site URL's in the web site database. If no match is detected, no further action is taken by the agent program, and web site communication is handled by the user's standard or default web browser. If a match is detected, the agent program starts the private browser. The private browser contacts the web site associated with the URL and waits for the remote server to return the requested web page to the private browser. Once the remote server has returned the requested web page to the private browser, the agent program determines the IP address of the remote server. The agent program then compares the IP address of the remote server with the IP address (or addresses) associated with the web site URL which are stored in web site database. If the IP address of the remote server does not match any of the IP addresses associated with the web site URL in the web site database, the agent program issues a warning that the user is not connected to the originally requested site, and does not allow user to retrieve sign-in credentials from the password store and send them to the web site. If the IP address of the remote server matches one of the IP addresses associated with the web site URL in the web site database, the agent program retrieves the user's credentials from the password store and passes them to the private browser which in turn passes them to the web site. If the user's credentials are accepted by the web site, a session is established and run completely within the private browser.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF AN EMBODIMENT OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to the drawing figures, the reference numeral 1 (FIG. 3) generally designates components of a secure web site authentication process which is an embodiment of the present invention. Generally, the process 1 is employed in cooperation with a user computer 3 to provide secure access over a universal computer network such as the Internet 5 to web sites storing information sensitive to a user of the computer 3, such as financial web sites 7 and 9. The process 1 functions to prevent attempted accesses to intended web sites 7 or 9 from being redirected to malicious or bogus web sites, such as web site 13, through phishing or pharming attacks, or other malicious activities.

Figure 3:
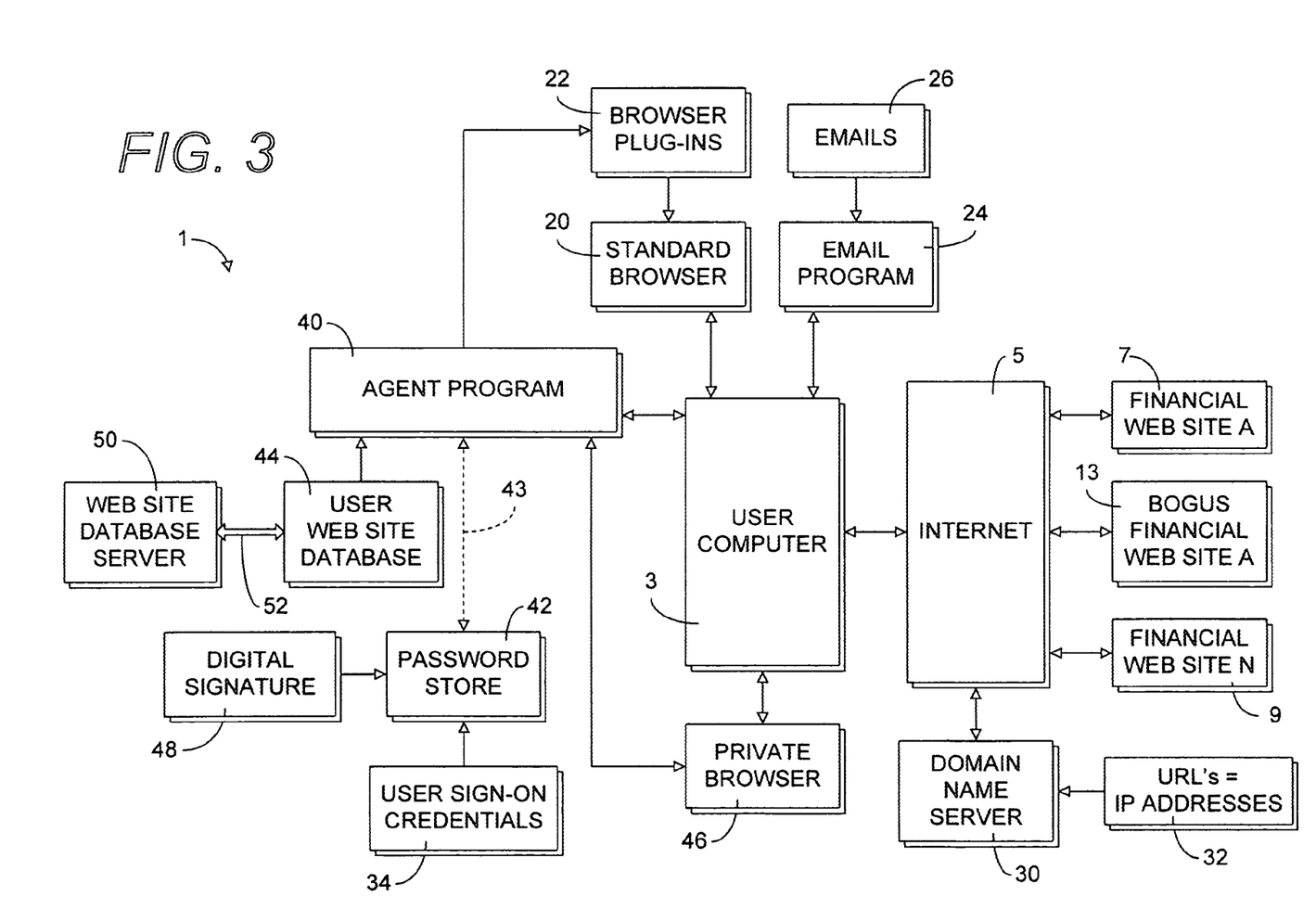
FIG. 3 is a block diagram showing principal components used by a secure web site authentication process according to the present invention.

The user computer 3 may be any type of so-called personal computer, such as a desktop computer, a notebook computer, a tablet computer, a personal digital assistant (PDA), or other computing device which can access web sites 7 or 9, through the Internet 5, either by wired or wireless connection, to conduct business therewith, including certain cellular telephones. Typically, the user computer 3 is a desktop or a notebook type of computer. Such computers 3 normally have a standard web browser program 20 installed therein for such Internet access, and the browser 20 may have browser plug-in programs 22 installed therein for expanding capabilities of the browser 20 for such things as reading particular data or image formats, playing various kinds of media files such as audio and video files, and the like. Such browsers 20 may include, but are not limited to, programs such as Microsoft Internet Explorer, Netscape, Mozilla Firefox, or the like. Conventional user computers 3 typically include an email program 24 which is used for sending and receiving emails 26 with other users.

A fact of current email operation is that users often receiving large numbers of unsolicited email 26, often referred to as "spam". Many spam emails are attempts to entice the user to spend money and are otherwise relatively harmless. However, some spam email includes malicious software, referred to as "malware", which may include computer viruses, worms, Trojan horses, spyware, adware, and the like. Some unsolicited email 26 has the appearance of originating from a trusted source, such as financial web site A (7) or financial web site N (9) and may include what appears to be a link to the financial sites 7 or 9, which may be a bank, an investment fund, or other financial entity with which the user may have an account. The email will include what appears to be a link to the web site of the financial institution and often will have a message which urges the user to access the link and "verify their account information". At the linked web site, the user is encouraged to enter their account credentials, such as user name and password, for their account at the institution to access their account information. However, the linked web site is actually a bogus web site 13 and any credential information entered by the user is logged and used to compromise the user's account, identity, or the like. Such malicious activity is referred to as phishing.

Domain name servers (DNS) 30 are used in Internet communications to convert URL's to numeric IP addresses 32. In another type of malicious activity, a domain name server 30 is corrupted to associate a URL, such as for financial web site A (7), with an IP address which is associated with bogus financial web site A (13). Thus, when a user attempts to access financial web site 7 and enters log-in or sign-on credentials 34, the user is actually accessing bogus financial web site 13 and giving the user's credentials 34 to the malicious site. The user's credentials 34 can then be used to access the actual financial web site A and manipulate the user's account. Such activity is referred to as pharming.

The secure web site authentication process 1 has been developed to monitor certain activities of the user of the computer 3 and to prevent actions which would compromise accounts of the user at institutions, such as those that are accessible at the financial web sites 7 and 9. The process 1 is implemented as an agent program 40 which operates in cooperation with a secure password store 42, a user web site database 44, and a private browser 46.

The password store 42 is a secure digital memory which stores the user sign-on or log-in credentials 34, such as user names and passwords, which the user must enter to access the user's accounts at the financial web sites. The password store 42 is preferably not part of the standard memory of the computer 3, but a separate memory module which can be separated and disconnected from the computer 3 when not needed to minimize its vulnerability to corruption. The password store 42 can, for example, be a smart card; a non-volatile USB memory device such as those referred to as thumb drives, jump drives, flash drives, or the like; or some other type of separable memory device having any appropriate conventional or proprietary configuration or format. In FIG. 3, the broken line 43 symbolizes the temporary connection of the password store 42.

The user web site database 44 stores URL's and IP addresses associated with selected trusted web sites, such as the financial web sites 7 and 9 and may contain additional information about the web sites, such as textual and/or graphic information associated with pages of the web sites. The user web site database 44 is protected by a digital signature 48 which is stored in the password store 42. The user web site database 44 is such that it can only be accessed when the password store 42 is connected to the computer 3. The web site database 44 is stored on the user computer 3 and is periodically updated. New information is provided by a remote web site database server 50 to user web site database 44 over Internet 5 using a secure connection protocol 52.

The private browser 46 is similar in many respects to standard browsers 20 in that the private browser 46 processes web page code to enable the computer 3 to access web sites. However, the private browser 46 has no architecture for extension of its capabilities by the installation of plug-ins 22. Malicious plug-ins for standard browsers 20 have been devised which can detect the entry of user credentials 34, which can then be sent to malicious web sites 13. However, without the capability of installation of any plug-ins, the private browser 46 cannot be corrupted in such a manner. Additionally, the private browser 46 of the process 1 cannot be activated by the user or by any programs other than the agent program 40.

Figure 4:
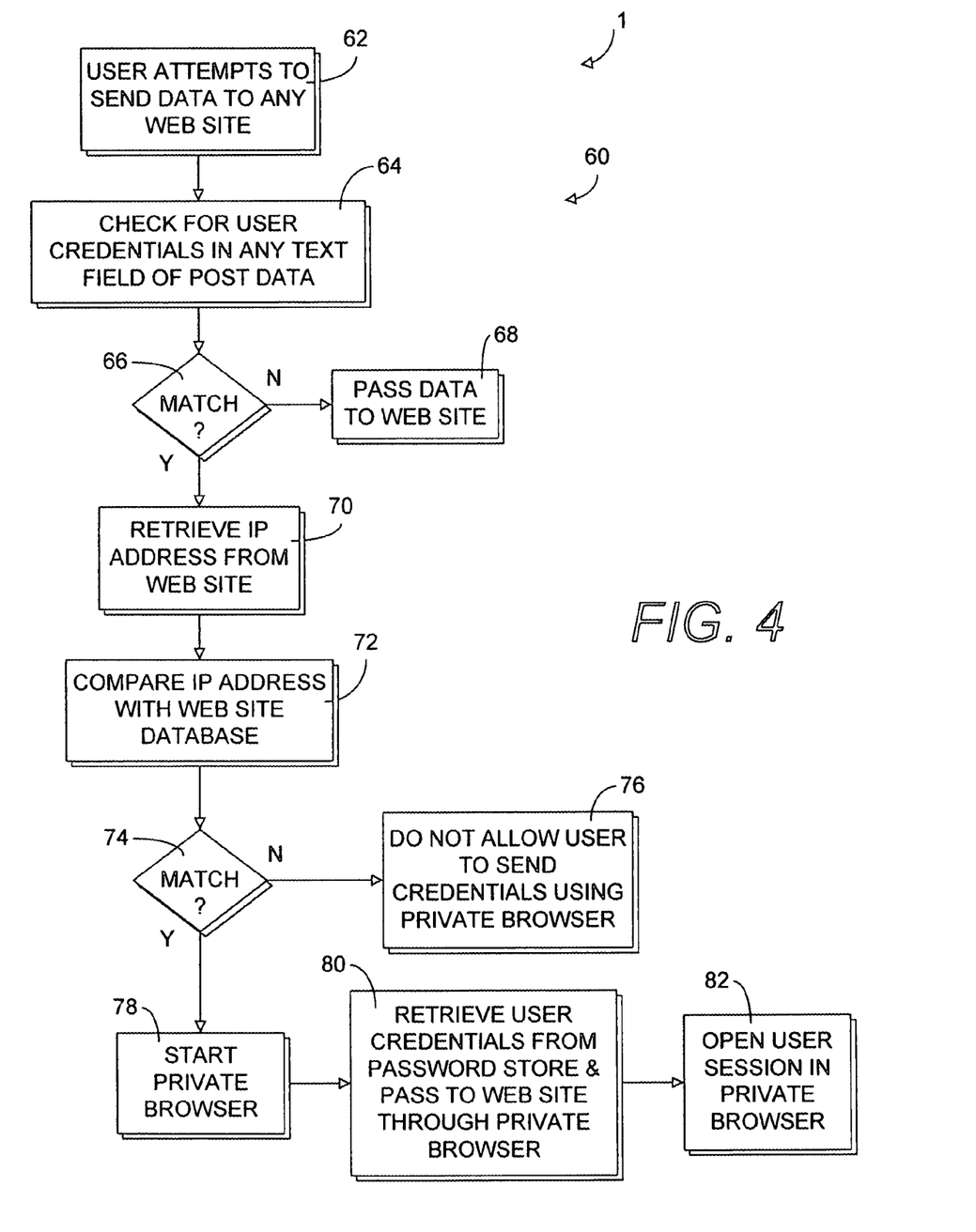
FIG. 4 is a flow diagram illustrating principal steps of a phishing protection embodiment of the secure web site authentication process of the present invention.

Referring now to FIG. 4, a phishing protection embodiment 60 of the process 1 functions to prevent phishing attacks.

If the user attempts to send any data to any web site at 62, the agent program 40 at step 64 checks the text of any post data against the user credentials 34 stored in the password store 42. If there is no match at 66, the agent program 40 allows the user data to be passed to the web site at 68. However, if a match occurs at 66, meaning that the user is attempting to post a sign-on credential 34, the agent program 40 obtains the actual IP address from the contacted web site at 70 and compares it with the IP address in the user web site database 44 that is associated with the particular sign-on credential 34 at step 72. If no match occurs at 74, the agent program 40, at step 76, warns the user that they may be compromising their account and prevents the user from sending the sign-on credential 34 using the private browser 46. However, if there is match at 74, indicating that the web site that has been contacted is the correct web site that is associated with the sign-on credential that was detected at step 66, then the agent program 40 activates the private browser 46 at step 78, at step 80 retrieves the sign-on credential 34 from the password store 42 and sends it to the appropriate web site through the private browser 46, and if the credential 34 is accepted by the contacted web site, opens a user session with the web site in the private browser 46 at step 82. Thus, the process 1, through the agent program 40, allows appropriate access to the financial web sites 7 and 9, with which the user has accounts, and prevents access with bogus web sites 13 or at least warns the user that the web site the user is attempting to contact is not the trusted web site.

Figure 5:
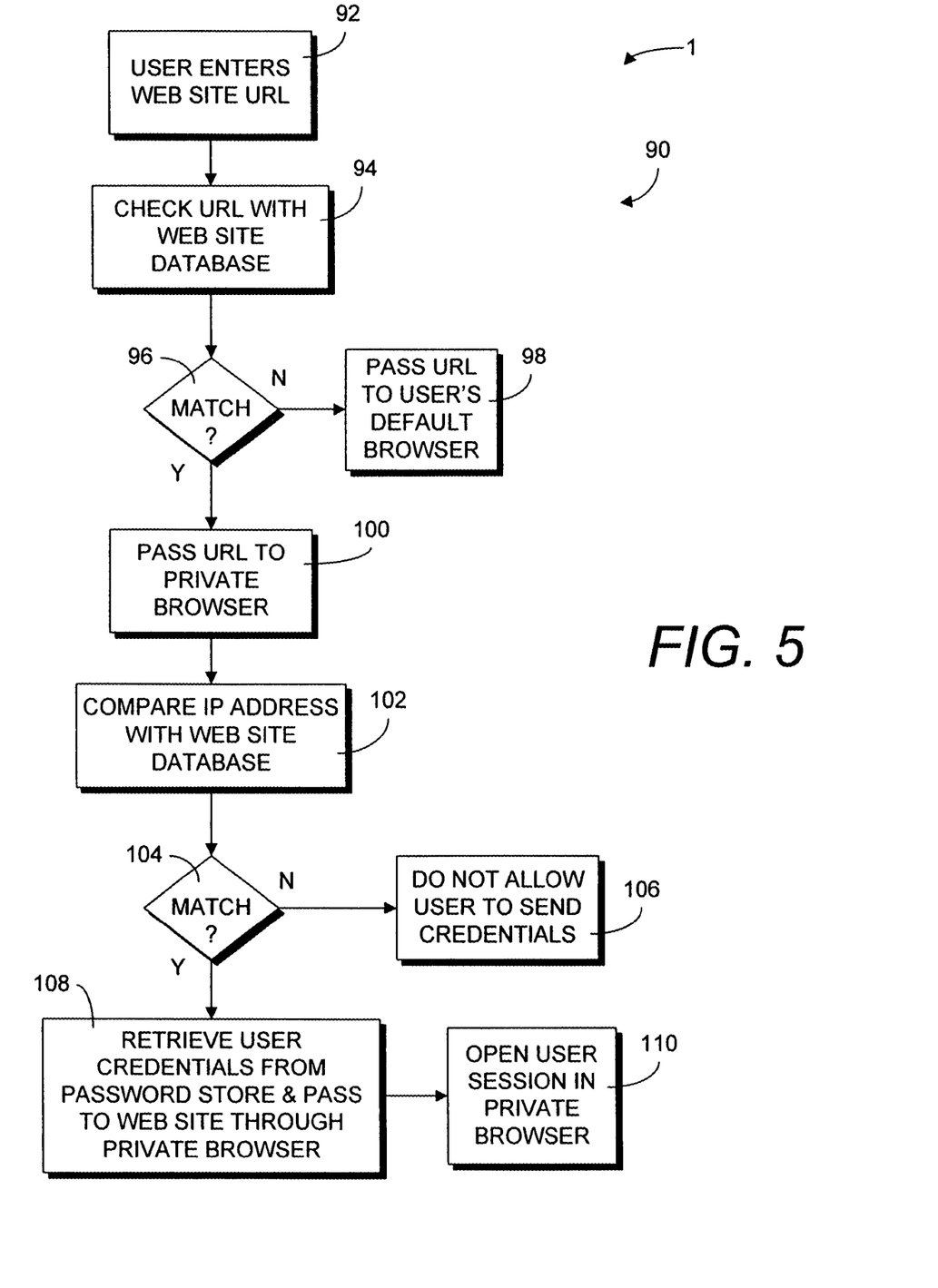
FIG. 5 is a flow diagram illustrating principal steps of a pharming protection embodiment of the secure web site authentication process of the present invention.

Referring now to FIG. 5, the process 1 includes a pharming protection embodiment 90 which prevents the user from unknowingly accessing bogus web sites 13 when a URL is entered for a legitimate web site 7 or 9. The agent program 40 includes a plug-in 22 which is installed in the standard browser 20 which is activated whenever a user enters a web site URL at step 92, or when a URL is invoked by clicking on a link or the like. When a URL has been entered, at step 94 the agent program 40 compares the URL entered or invoked with the URL's stored in the user web site database 44. If no match occurs at 96, at step 98 the agent program 40 passes the URL entered to the standard browser 20, but prevents the user from sending any sign-on credentials 34 to the web site identified by the entered URL. If a match occurs at 96, indicating that the entered URL is associated with a trusted site, the agent program 40 activates the private browser 46 to access the web site identified by the entered URL, at step 100. The remote server at the web site returns the requested web page, from which the agent program 40 determines the IP address of the web site. At step 102, the agent program 40 compares the returned IP address to the stored IP address associated with the URL that was entered. If no match occurs at 104, at step 106 the agent program 40 warns the user that the accessed site is not the site that should be associated with the entered URL and prevents the user from sending any sign-on credentials 34 to the site. If a match occurs at 104, indicating that the accessed site is a trusted site, at step 108 the agent program 40 retrieves the 2093198.1 17 appropriate sign-on credentials 34 from the password store 42 and passes them to the web site through the private browser 46. If the sign-on credentials 34 are accepted by the web site, a user session is opened in the private browser 46 at step 110. The pharming embodiment 90, thus, detects a mismatch between a URL of a web site and the IP address that should be associated with and thereby protects the user from pharming attacks.

It is to be understood that while certain forms of the present invention have been illustrated and described herein, it is not to be limited to the specific forms or arrangement of parts described and shown.

What is claimed and desired to be secured by Letters Patent is:

1. A secure process for user access of web sites, comprising:
   (a) a user computer;
   (b) a web site database for installation on said user computer and for storing respective internet protocol (IP) addresses and corresponding uniform resource locators (URL) for each web site a user has previously established user credentials for secure access;
   (c) an agent program for installation on the user computer and providing for retrieval of IP addresses from any web sites said user attempts to access in a standard browser by providing user credentials, and for not allowing said user credentials to be forwarded unless a corresponding and particular IP address retrieved is already known in the web site database as a trusted web site;
   (d) a private browser for installation on said user computer, said private browser being incapable of having any browser plug-ins installed therein and controllable only by the agent program, and for solely conducting user sessions with trusted web sites;
   wherein, user credentials are only supplied to a trusted web site and only supplied by the private browser and only if the agent program finds a correspondence of the retrieved IP address with information stored in the web site database; and
   wherein said private browser, instead of the standard browser, establishes the user sessions with trusted web sites upon supplying said user credentials.

2. The process of claim 1 further comprising:
   a device for storing textual user sign-on credentials associated respectively with said trusted web sites in a password store accessible by said user computer.

3. The process of claim 1 further comprising:
   a device for storing one or more textual user sign-on credentials associated respectively with said trusted web sites in a password store within a protected digital memory device connectable to said user computer.

4. The process of claim 1 wherein:
   the web site database is configured to be updated by periodic secure connections of said user computer with a web site database server.

5. The process of claim 1 further comprising:
   a protected digital memory device connectable to said user computer with textual user sign-on credentials associated respectively with said web sites and configured in a removable password store;
   a digital signature for protecting access to said web site database and stored in said protected digital memory device.

6. A secure web site authentication processer (1) for use with a user computer (3) configured to access a variety of web sites (7, 9, 13) over the Internet (5), comprising:
   a user web site database (44) for keeping address information (32) related to trusted web sites (7, 9) that include those for which a user has previously established corresponding user credentials;
   a password store (42) for keeping user credentials (34) corresponding to pre-established web site addresses maintained in the user web site database (44);
   a standard browser (20) extendable with browser plug-ins (22);

the improvements characterized by:
a private browser (46) characterized by its inability to be extended with browser plug-ins (22), and wherein user sessions (82) are limited to trusted web sites (7, 9); and
an agent program (40) connected to the user computer (3), the browser plug-ins (22), the user web site database (44), the password store (42), and the private browser (46), and having sole control of the private browser (46), wherein user attempts in the standard browser (20) to send user credentials (34) to any web site automatically triggers a retrieval of the IP address and a comparison with those stored in the user web site database (44), and only if a corresponding match is found then the private browser (46) is called upon to supply the corresponding user credentials (34);
wherein the private browser (46), instead of the standard browser (20), is configured to establish a user session (82) with a trusted web site upon acceptance of the supplied corresponding user credentials (34);
wherein, redirected access to malicious and bogus web sites (13) are prevented by not allowing user credentials (34) to be sent to non-corresponding web sites (7, 9, 13).

7. The secure web site authentication processer (1) of claim 6, wherein the user web site database (44) includes a digital signature (48) which is stored in the password store (42) and configured such that only the user web site database (44) can be accessed when the password store (42) is connected to the user computer (3).

8. The secure web site authentication processer (1) of claim 6, wherein the web site database (44) is configured to be periodically updated over the Internet (5) with new information from a remote web site database server (50).

* * * * *